G. DOUGLASS.
Car Spring.
No. 1,461.
Reissued Apr. 28, 1863.
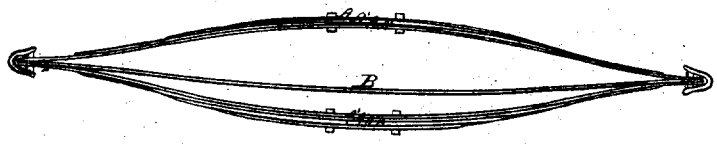
Fig. 1.
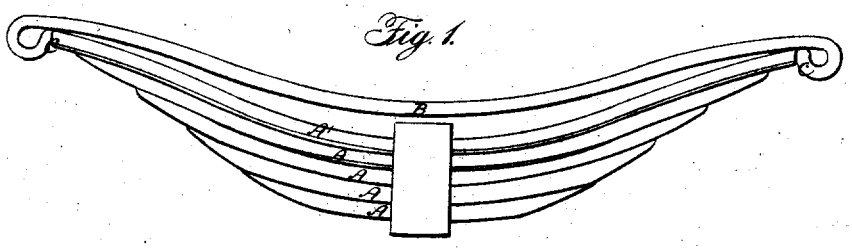
Fig. 2.
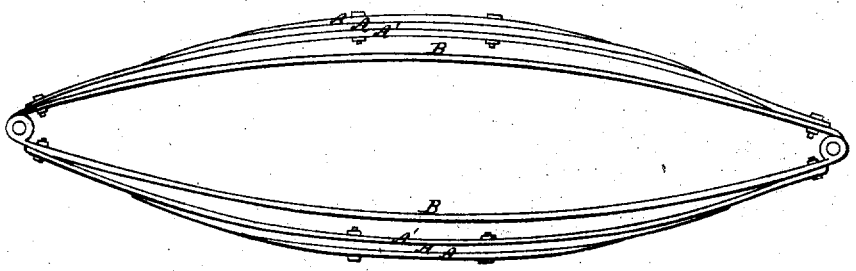
Fig. 4.
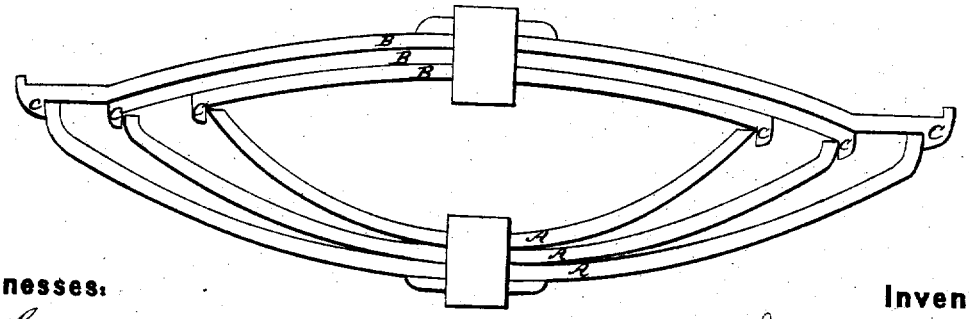
Witnesses:
C. C. Coffswell
Inventor:
George Douglass.
By Robbins & Burr
his Attorneys
AM. PHOTO-LITHO. CO. N.Y. (OSBORNE'S PROCESS.)

UNITED STATES PATENT OFFICE.

GEORGE DOUGLASS, OF SCRANTON, PENNSYLVANIA.

IMPROVEMENT IN CAR-SPRINGS.

Specification forming part of Letters Patent No. 18,961, dated December 29, 1857; Reissue No. 1,461, dated April 28, 1863.

*To all whom it may concern:*

Be it known that I, GEORGE DOUGLASS, of Scranton, in the county of Luzerne and State of Pennsylvania, have invented a new and useful Improvement in Springs for Railroad-Cars, Locomotives, and other Vehicles; and I do hereby declare that the following is a full, clear, and exact description of the same, reference being had to the accompanying drawings, forming part of this specification, of which—

Figure 1 is a side view of my improved semi-elliptic heavy locomotive-spring. Fig. 2 is a similar view of an elliptic carriage-spring of my invention with double tension-plates B B. Fig. 3 is also a similar view, on a smaller scale, of an elliptic carriage spring containing a single tension leaf or plate, B, showing the position and operation of its parts when it is compressed under the influence of power or weight applied and sustained in the usual manner. Fig. 4 is a side view of a compound locomotive-spring, showing another mode of applying my invention to attain its useful purposes.

My invention relates to springs of the description known as "elliptic;" and it consists in the use of an elastic tension plate or bar, B, in connection with the curved plates or leaves A A A′ of these springs, whereby the whole spring is not only greatly strengthened and its durability increased, but, with the same weight of metal, greater elasticity and a gain of more than twenty-five per cent. in its resilient power is obtained.

The construction of my new and improved spring is simple and easily illustrated.

To the ordinary well-known forms of elliptic springs (constructed of properly-tempered curved elastic plates or leaves of steel, A A A′, made of different lengths, then laid upon each other and united or bound together at or near their central point of superposition, substantially as represented in Figs. 1 and 2) I add one or more additional leaves or plates, B, of about the same thickness, temper, and degree of elasticity as the upper or inner leaves, A′, of the springs, but of a less degree of curvature. This additional leaf or plate B of my improved spring may be united to the inner or upper leaf, A′, of the series of combined leaves A A A′, Figs. 1, 2, and 3, by means of bolts and nuts or rivets at either end of the same, as represented in Figs. 2 and 3; or it may be retained in its proper position and made to operate in combination with the fasciculated leaves A A A′ by means of angular or curved terminal loops or stops C C, formed at either end of the tension plate or plates B, as clearly represented in Figs. 1 and 4. By means of these stops C C, Figs. 1 and 4, or their equivalent rivets or nuts in Figs. 2 and 3, the expanding movement of the leaves A A A′, when under pressure, is at once communicated to the plate B, creating a longitudinal tension thereof; hence, when by pressure on the upper and lower centers of the compressible portion of my elliptic springs, Figs. 2, 3, and 4, or upon the lower center and the ends of the semi-elliptic spring, Fig. 1, the resistance of the leaves A A A′ is overcome and they are straightened (as in Fig. 3) and yield in the direction of the pressure alone, the additional leaf or plate B, being free at its center, is extended by their expansion and exerts a longitudinal tension thereon, (as illustrated in Fig. 3,) which greatly increases the elasticity, strength, and power of the spring.

As the tension plate or leaf B acts as a chord to the arc which is formed by the fasciculated leaves A A A′, it limits by its own length their straightening out or expansion, and thus completely protects them from undue expansion and the weakening effects of sudden concussion, and, within reasonable limits, prevents the possibility of their compression into a state of total non elasticity, and the serious consequences which might under certain circumstances result therefrom.

The elasticity of the tension chord or plate B is added to that of the spring proper, and by its play in coincidence therewith in itself greatly increases its efficiency.

In the construction of my improved tension-plate elliptic springs one or more tension-plates, B B, may be used in combination with one or more elliptically-curved leaves or plates, A A A′, and be arranged in groups or series and united centrally, as represented in Fig. 4; or they may be otherwise united or arranged in simple combinations involving the modifications represented in the remaining figures.

I do not claim as my invention the overlapping of the tension-plates by which the stops C C are formed, as illustrated in Figs. 1 and 4; nor do I desire or intend to limit myself to the manner of uniting or securing the tension-plates B B to the elliptic leaves A A A′ of my improved spring, as herein described.

I am also aware that a doubly-curved spring has been combined with an elliptic spring in such a manner as to act conjointly therewith, but not in such a manner as, under any circumstances, to act as a controlling-chord to the arcs formed by the elliptic plates of said spring.

What I claim, therefore, as my invention, and desire to secure by Letters Patent, is—

The combination of elliptically-curved plates A and B, of different degrees of curvature in the formation of an elliptic or semi-elliptic spring, in such a manner as that, when it is under the influence of weight or pressure one or more plates, B, of said spring will tie the remaining plates, and by limiting their expansion prevent an undue diminution of their curvature and elasticity, all substantially in the manner and for the purpose herein set forth.

GEORGE DOUGLASS.

In presence of—
F. R. SHILSTONE,
JAMES HUGHES.